(12) United States Patent
Powers

(10) Patent No.: US 6,438,584 B1
(45) Date of Patent: Aug. 20, 2002

(54) AUTOMATIC GENERATION OF GRAPHICALLY-COMPOSED CORRESPONDENCE VIA A TEXT EMAIL-INTERFACE

(75) Inventor: Gene Powers, Tiburon, CA (US)

(73) Assignee: Letter Services, Inc., San Rafael, CA (US)

( * ) Notice: Subject to any disclaimer, the term of this patent is extended or adjusted under 35 U.S.C. 154(b) by 0 days.

(21) Appl. No.: 09/520,654

(22) Filed: Mar. 7, 2000

(51) Int. Cl.[7] .............................................. G06F 15/16
(52) U.S. Cl. ...................... 709/206; 709/202; 709/203; 709/232; 709/246; 358/402; 358/442
(58) Field of Search ................................ 709/200–203, 709/205–207, 217–218, 238, 232, 245–246; 358/402–403, 407, 440–442, 458; 455/412–419, 445; 345/752

(56) References Cited

U.S. PATENT DOCUMENTS

| | | | |
|---|---|---|---|
| 5,426,594 A | 6/1995 | Wright et al. | 709/206 |
| 5,513,117 A | 4/1996 | Small | 700/233 |
| 5,742,905 A * | 4/1998 | Pepe et al. | 455/445 |
| 5,805,810 A | 9/1998 | Maxwell | 709/206 |
| 5,930,479 A * | 7/1999 | Hall | 709/206 |
| 5,937,160 A * | 8/1999 | Davis et al. | 709/203 |
| 5,961,590 A * | 10/1999 | Mendez et al. | 709/206 |
| 5,999,967 A * | 12/1999 | Sundsted | 709/206 |
| 6,018,761 A * | 1/2000 | Uomini | 709/206 |
| 6,020,980 A * | 2/2000 | Freeman | 358/402 |
| 6,023,345 A | 2/2000 | Bloomfield | 358/402 |
| 6,028,679 A * | 2/2000 | Murphy | 358/407 |
| 6,252,588 B1 * | 6/2001 | Dawson | 709/206 |
| 6,330,590 B1 * | 12/2001 | Cotten | 709/206 |

* cited by examiner

Primary Examiner—Bharat Barot
(74) Attorney, Agent, or Firm—Barry L. Davison; Davis Wright Tremaine LLP

(57) ABSTRACT

A system and method for generation, graphical composition, and delivery (or routing for delivery) of conventional forms of written correspondence. Specifically, the conventional form of written correspondence (i.e., business letter) is generated from a text Internet email message. More specifically, a sender can initiate correspondence in a variety of formats, to multiple recipients or to group(s) of recipients, wherein there is security provided against unauthorized generation of correspondence by assumed SMTP email identities, thereby preventing "forgery" of a correspondence from the sender.

18 Claims, 10 Drawing Sheets

System Architecture

System Architecture

Overall System Flow Chart

Overall System Flow Chart

Overall System Flow Chart

FIG. 8

AXIOM DYNAMICS
1234 Harrison Street   San Francisco, CA 94104   Tel: (415) 787-9876   Fax: (415) 787-9878   www.axiomd.com November 1, 2000

Rob Matthews
Internet Services Corporation
123 Main Street
San Francisco, CA 91013

Dear Rob:

I appreciate the time you spent today with me to go over the Carter deal. It is a great opportunity for both our companies, and I'm convinced we can make it happen!

I will follow up with Mr. Carter as we discussed and get back to you with a time for our joint meeting with him next week. Thanks again! and I look forward to working with you on this.

Best Regards,

Freda C. Jones
VP of Business Development
FJ/lc

You, too, can send email like this with LetterClick...FREE. Click here.

AUTOMATIC GENERATION OF GRAPHICALLY-COMPOSED CORRESPONDENCE VIA A TEXT EMAIL-INTERFACE

TECHNICAL FIELD OF THE INVENTION

The present invention provides a method for generation, graphical composition, and delivery (or routing for delivery) of conventional forms of written correspondence. Specifically, the conventional form of written correspondence (e.g., business letter) is generated from a text Internet email message. More specifically, a sender can initiate correspondence in a variety of formats, to multiple recipients or to group(s) of recipients, wherein there is security provided against unauthorized generation of correspondence by assumed SMTP email identities, thereby preventing "forgery" of a correspondence from the sender.

BACKGROUND OF THE INVENTION

The present invention is in the field of computer-generated correspondence. The evolution of this field has begun by focusing on tools that assist a computer user in composing written communications through a number of disparate interface methods. Previous disclosures for composing and producing computer assisted written communications have included word processing applications, computer Fax applications, Internet greeting card providers, Internet Fax from email (or Web Browser) services, Internet email to postal mail services that simply reproduce what they receive plus addressing, and Internet service(s) providing direct mail fulfillment services from a graphical template composed by and provided by the user. However, such services do not allow full reproduction of traditional written communication formats and media, or at best require significant intervention and/or actions by the sender (and at times by the receiver) to achieve such formats. Additionally, none of these present a unified interface for composing and delivering differing forms of written communication.

Traditional written communication formats include, for example, all forms of written communications generated including business letters on business letterhead (sizes 8½"× 11", A4, Legal, Monarch, etc.), business notes/memos, business announcements/invitations, business form letters, business postcards, business legal notifications, personal letters, personal letter on personalized stationery, personal notes/ cards, personal announcements, personal postcards. These forms of communication historically use various combinations of layout, handwriting, hand printing, signatures, preprinted fonts and graphics. Earlier services fall short of reproducing these formats automatically or with ease. Word processing programs can generally be configured to produce these formats, however it is a manual and cumbersome process with many steps. Many users are not capable of the graphics manipulation required to compose these formats with letterhead and signature. Furthermore, it is left to the user to render the composition into hardcopy form and to arrange the delivery connection. Internet greeting card providers (both e-card and hardcopy card vendors) provide only limited personalization for the cards they vend. Greeting card providers do not provide a handwriting equivalent that reflects the user's personal cursive style nor do greeting card providers provide an essential "signature" to personalize the card. One service exists for ordering hand calligraphy on cards, but this is not an automated process. Internet FAX-from-email and letter/direct-mail-from-email providers either force the user to compose the graphics of his or her message manually with a word processor or provide "canned" formats without personalization of signature, personal stationery or business logos.

Email Systems

In computer network systems such as local-area networks ("LANs"), wide-area networks ("WANs"), and the Internet and the world-wide web ("WWW"), electronic mail ("email") systems are often utilized to facilitate communication between two or more users of the network. Each user has a unique network address that may be used for routing and identifying purposes in delivering an e-mail message from one user (the "sender") to another user (the "recipient") on the network. Often an e-mail message contains a relatively small amount of text or other forms of data. One or more additional files of data, called "attachments" are often attached to the e-mail message. For example, a word processing file or graphic file that is incompatible with the display capabilities of the e-mail system or that is too large to be conveniently displayed by the e-mail application program may be transmitted from the sender to the recipient by attaching it to an email message. The e-mail message may introduce or explain the attachments. Thus, the recipient receives the e-mail message plus any attached data files, wherein the attached data files must be opened, accessed, or utilized separately from the email message itself. One drawback is that this method requires the recipient have the necessary software to open and display the attachment(s). A final drawback of this technique for electronic deliveries is that the size of the email with attachments is often large, and requires relatively long upload times for the sender and download times for the recipient.

HTML formats have become the language of page compositions for web sites. Moreover, objects can be scanned into HTML formats for use in web pages. Composition and display of HTML formats has been added to most mainstream email programs. However, there is a large time commitment needed to design HTML email formats with scanned inputs and graphical elements. Hence, this format has not been generally utilized for personal correspondence in email messages due to the need to not spend inordinate periods of time doing such tasks. Several World Wide Web sites offer some rudimentary HTML graphics associated with email created at their site, but none approach the problem of generating full traditional correspondence formats or an easier method of interface than the World Wide Web can provide. Furthermore, adapting HTML composition techniques to produce suitable quality output for hardcopy local to the user for postal, courier or express deliveries is cumbersome and rampant with potential time consuming problems.

Internet Letter Services

Netgram™ and Eletter™ represent services that utilize email and database methods and have limitations and drawbacks that leave room for major improvements. Drawbacks that are shared by both, are 1) that the "sender" can only initiate a transaction that results in a physical postal mail item or items, 2) no graphical composition other than what the user provides, is supported 3) the "sender" does not "see" and approve the final article that is sent to the recipient, until after the fact or by special manual arrangement that significantly delays the sending.

While Eletter™ will generate and post for delivery a letter to the recipient sent by email from the sender, it is up to the recipient to provide the fully formatted letter, along with the list of addresses, in conventional mail merge format. Eletter™ will then provide the necessary printing, assembly and mailing services. While this technique is suitable for volume mailings (i.e., junk mail), it does not offer the convenience, automatic composition, selection of media and delivery methods that the invention does.

Netgram™ is uses a crude form of composition with no flexibility to generate anything beyond a single format of written correspondence, that contains formatting and graphics to the extent that the user provides them in the initial e-mail request. Therefore, "Netgram™" is much like an Internet telegram or Western Union mailgram, and results in a message printed centrally, or remotely, that is then placed in an addressed envelope and delivered by regular postal means. Therefore, there is a need in the art to improve upon the drawbacks of Netgram™, such as, 1) Netgrams cannot replicate standard forms of communication other than the "telegram" format, or some similar "print-on-plain-paper" format with a header above text and/or whatever graphics are supplied by the "sender"; 2) while a user could theoretically supply all the graphics for replicating conventional written communication, the Netgram™ method does not permit automatic integration of the "recipient" address inside the email provided by the "sender" and hence the sender would have to supply the "recipient" address twice, inside the graphical email and then to the Netgram™ delivery system; 3) the "sender" never sees the Netgram™ before before it is sent (in case an error was made in supplying the address, or if the formatting of the Netgram™ is undesirable; or 4) the Netgram™ method allows a forgery to be easily made, due to the way that SMTP email protocol works on the Internet; whereby a forger can assume the identity of the "sender" by setting up an email program with the "senders" public email identifier, and by guessing (or in some other manner, such as examining mail headers on the internet or in storage folders, determining) the "recipient id" that the sender would use for a particular addressee and send any message, under the identity of the "sender" to the "recipient".

SUMMARY OF THE INVENTION

The present invention provides a process for generating completed mail objects from email messages from registered senders to be received by recipients in hard copy and comprising graphical correspondence content (e.g., business letterhead, personal letterhead, card graphics, photo postcard graphics, etc.) and graphical representation of a signature, comprising:

(a) receiving a correspondence message from the registered sender containing text, names of recipients and identity of the sender;

(b) locating registered sender information in a database, wherein the database comprises preferences having at least correspondence format information and a graphical representation of a registered sender signature;

(c) obtaining recipient location information from either the database containing names and addresses or recipients for each registered sender or directly from the registered sender; and (d) generating a completed correspondence to deliver to the recipient by one or more transmission means selected from the group consisting of transmitting a facsimile to a facsimile telephone number utilized by the recipient, transmitting an email providing or linking to a graphical representation of the correspondence to an Internet address utilized by the recipient, generating a hard copy of the completed correspondence for submission by hard copy delivery services, and combinations thereof, wherein the completed correspondence comprises the registered sender's letter head or card graphics (such as greeting card graphics, thank you notes, etc.), registered sender's message, and registered sender's signature and correspondence message.

Preferably, the correspondence message further comprises additional information, including but not limited to attachments (e.g., graphical images or documents) and preferences. Most preferably, new or amended preferences are specified in a subject line of an email message. Preferably, the hard copy completed correspondence is generated at a location facilitating rapid delivery to the recipient using existing delivery services. Preferably, the completed hard copy correspondence is created at a location adjacent to an overnight courier hub or at a location adjacent to a major regional postal service hub. Preferably, the completed hard copy correspondence is sent by facsimile transmission to the recipient's fax telephone number. Preferably, the database includes names, postal addresses, email addresses, and telephone numbers for recipients. Preferably, the database includes the potential for each registered sender to have multiple formats for documents, to have multiple signatures for each registered sender, and to allow multiple registered senders to share certain preferences with a particular registered sender, and identification information for the registered sender to include with each correspondence.

Preferably, prior to step (d), there is a further step comprising generating a proof copy of the correspondence to be sent by email to the sender for review and approval. This step helps to implement a security measure to the inventive process. Most preferably, the sender approves the proof copy of the correspondence by return email or by HTTP transmission. Most preferably, the sender is able to change the correspondence or the preferences associated with the correspondence. Most preferably, the preferences that can be changed are selected from the group consisting of correspondence type, letterhead or card graphics style, recipient delivery means, greeting, closing, signature, text of correspondence, and combinations thereof.

The present invention further provides a system or apparatus for generating completed mail objects from e-mail messages from registered senders to be received by recipients in remote locations in hard copy, Fax transmission or HTML email (dual mode contains a text URL pointer to an on-line HTML image as well as the full HTML) and comprising message information, graphical letterhead or card content, and graphical representation of a signature, comprising:

(a) a computer or server means for receiving a correspondence message from the registered sender containing text, names of recipients and identity of the sender;

(b) a database having registered sender information and preferences, wherein the database comprises a sender's preferences for correspondence format information (e.g., letterhead, greetings, closings), recipient information and addresses and a graphical representation of a registered sender signature;

(c) recipient location information, wherein the source is from either the database containing names and addresses or recipients for each registered sender or the registered sender; and (d) a remote or local facility for generating a completed hard copy correspondence at a location facilitating rapid delivery to the recipient using existing delivery services, wherein the completed correspondence comprises the registered sender's letter head, registered sender's signature and correspondence message, or a Fax server for generating a fax correspondence telephoned to the recipient's fax, or an Email server for sending the correspondence in an HTML format.

Preferably, the correspondence message further comprises additional information, including but not limited to attachments (e.g., graphical images or documents) and preferences. Most preferably, new or amended preferences are specified in a subject line of an email message. Preferably, the completed hard copy correspondence is created at a location adjacent to an overnight courier hub or regional postal service hub. Preferably, the completed hard copy correspondence is sent by facsimile transmission to the recipient's fax machine. Preferably, the database includes names, postal addresses, email addresses, and telephone numbers for recipients. Preferably, the database includes the potential for each registered sender to have multiple formats for documents, to have multiple signatures for each registered sender, and identification information to include with each correspondence.

BRIEF DESCRIPTION OF THE DRAWINGS

FIG. 8 shows an example of a final HTML email delivered correspondence item—has been entered.

DETAILED DESCRIPTION OF THE INVENTION

Figure 1:
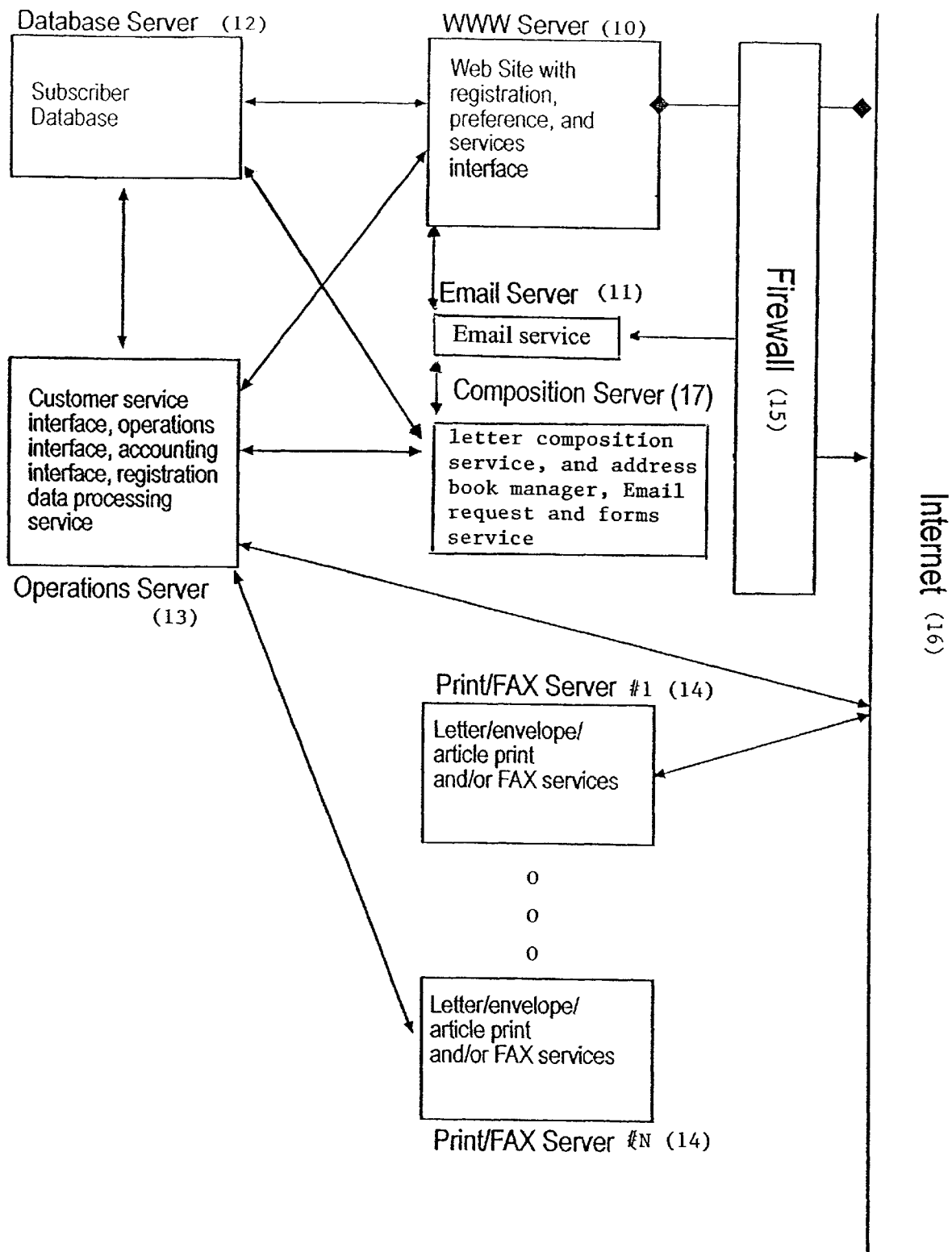
FIG. 1 shows a flow chart of a hardware design to implement the inventive process.

The present inventive process provides the following marketing advantages with the following features for generating hard copy quality correspondence to a recipient from an email sent by a sender or by a registered sender using the corresponding Web site. Furthermore, the inventive process and system additionally provides composition, routing and delivery of Fax communications and for composition, routing and delivery of electronic versions of all written communications by the same sender email interface. All of these improvements and additional functions are added at maximum convenience to the sender of the invention, in that the sender can utilize the familiar interface of his or her email program to effect all these results.

Composition Module Specification

The invention produces traditional written correspondence in diverse formats including HTML Email (includes text email with URL link), and as hardcopy deliverable items. Such hardcopy items vary in physical size and layout, (e.g., Faxes, full-size business letter, personal letters, monarch/executive size letters, announcements, cards, photo postcards etc.). The present invention includes a process for decomposing and storing the graphic structure of various correspondence items (in particular letters) that permits recomposing them for specific individual and personal correspondence items. This is the process of registering a sender. The sender registration process utilizes recomposing graphics and various correspondence components assembled in a database as "preference" entries for a particular sender and further sender preferences include an address book of a recipient or recipients including preference information for each recipient as to how the correspondence is to be composed and sent.

Graphic components and sender information (both called "preferences") are stored in the database when a sender registers for use of the system. Recipient information and preferences for correspondence with the recipient are set by the sender by methods, such as (1) uploading addressee information at the WWW site for the service in various formats that are converted to the service database and stored in association with the sender; (2) entering addressee information and correspondence preferences at the WWW site for the service; and (3) issuing an email request for correspondence to an "unknown" or "previously undefined" addressee. In the latter case, the inventive apparatus sends an HTML form to the sender, via email, requesting the missing recipient address information and correspondence preferences. Such new recipient (to the sender) information must be returned prior to issuing the correspondence.

The Composition Module

The Composition module retrieves various components or preferences from the database entries stored for a particular sender to create the image of the letter it is producing. Delivery means, such as HTML emailFax, and printed hardcopy all have different requirements of resolution and color, so the database must store a different image (or several image components) for each type of output. Therefore, recipient preferences, including, for example, addresses (postal, street for FedEx, Internet, and facsimile), correspondence style, signature style (i.e., first name only, initials, or full name), letter closing (e.g., sincerely, best regards, right on!, etc.) and greeting (e.g., Mr. or Ms, full name of recipient or first name of recipient) are all preferences that can be specified by a sender for each recipient. Alternatively, the image composition module must generate these image variations on the fly, but this causes a processing load that may be unacceptable for high volume usage of the composition module.

There are differing requirements for each preference of correspondence production. Therefore, each sender can register multiple preferences for a single field, such as electronic images for the sender's business letterhead, business envelope, personal stationery and Formal/Standard/Casual signatures. Such high resolution and original source files will be varying formats and resolutions, and will typically be produced by a high-resolution scanner or with various graphics composition programs, like Adobe Print Shop. Often, these images are higher resolution than a printer technology can render, and of a higher resolution than would be needed to produce any of the output forms mentioned.

Upon update or initial entry of a high resolution source image (e.g., a signature block or a letterhead), the apparatus and database produce and store a plurality of secondary image files for each of these files sets. The file sets are used, for example, to produce HTML letters (for example, 72 dpi 16MM color images having .png files produced and stored in the database), to produce Faxes (200 dpi 256 gray scale images), and to produce color printout (600 dpi or greater, 16MM color, TIFF images). Each letterhead and envelope scan can be broken down into areas of the page (for example 8 page areas) that are reassembled by the composition software to recreate the page graphics. For example, the top of a page can be divided into three areas (left, middle and right). Similarly, the bottom of a page is divided into three sections of left middle and right. Each side is a separate area and the middle is an area. This system allows for more efficient storage per fullpage image. However, full-images for hardcopy are preferable because non-HTML page composition engines typically overlay elements without any problem. Therefore, for hard copy, a letter or correspondence can be "overlayed" on the blank area in the letter. Also, the blank areas do not appreciably increase the file size for most formats, because one full-page image file may actually take less bytes than several partial-page image files.

For "HTML only" letters to shrink and expand, between the dimensions of an HTML "page", the extra regions at top and bottom are needed for proper layout on a variable size page. Each area is stored with an absolute offset from the top left corner of the original page. The image for an area may be any size, for example, area 1 may extend all the way across the top of the page, if area 2 and 3 are empty or it may extend only partially across the page and areas 2 and 3 may be empty. Business-sized envelopes have the areas at the top and left margin.

The database stores the original scans (preferably 1200 dpi or higher), generated graphics, or vector graphics for letterhead, envelope and signatures (multiple types) for each sender or the original digital files provided by each sender. Each sender is identified, for example, by the source email address (from identifying box) such that the proper database preferences for an identified sender can be accessed. Alternatively, the sender is identified by a sender login process on a web site. Furthermore, the system determines the addressing and delivery information for the intended recipient(s) from database(s) or database table(s) associated with the identified sender by, for example, referencing the "To" identifier(s) in an initiating email, or by recording selections made by a sender issuing a request on a web site.

The final composition process for fax delivered correspondence items, print delivered correspondence items, and HTML email delivered items is somewhat different, so each is separately described. Preferably, the production of a correspondence for delivery is based on a proof copy form that has been returned by the sender, though the proof copy review is not an essential step in the inventive process. Proof copy composition is detailed following final delivery item composition.

In the case of a hardcopy printed letter composition works the following steps describe a preferred embodiment for automatic composition activities performed for the sender.
1) The type of correspondence (e.g., Business/Personal/Legal) is determined from the sender's addressee database entry(ies) for the recipient(s) or from "approved" proof copy form.
2) The delivery method(s) of the correspondence (e.g., Email/FAX/Postal/Express) is determined from the sender's addressee database entry(ies) for each recipient(s) or from an "approved" proof copy form.
3) The format and size and layout of a correspondence item is determined (e.g., 8½×11, A4, 8½×14, Monarch, postcard, announcement) from database preferences or from an "approved" proof copy form.
4) The appropriate high resolution graphics for the stationery, card or letterhead are retrieved from the database (including multi-part graphics; such graphics are supplied or selected in advance by the sender as part of registration) or from an "approved" proof copy form.
5) The fonts are determined from the sender's database or preferences or from an "approved" proof copy form.
6) The date of the letter is composed according to the retrieved fonts and layout (preferences) or from an "approved" proof copy form.
7) The inside address of the letter is composed with an address book entry for the recipient according to the retrieved fonts and layout or from an "approved" proof copy form. If the proof copy form indicates changes and an update of the address book (database) is requested, these changes are posted to the appropriate sender's address book entry in the database.
8) The greeting is composed according to the retrieved fonts and layout (preferences) or from an "approved" proof copy form.
9) The body of the correspondence specified by sender request is formatted and composed according to the retrieved fonts and layout (preferences) or regenerated from an "approved" proof copy form.
10) The closing is composed according to the retrieved fonts and layout (preferences) or from an "approved" proof copy form.
11) The appropriate signature graphic is retrieved from the database according to the retrieved layout or from an "approved" proof copy form.
12) The printed name is added from the sender's database entry or from an "approved" proof copy form.
13) A secretarial line is added for business letters according to the sender's database entry or from an "approved" proof copy form.
14) The enclosures line is added where appropriate (attachments specified with initiating request are stored and reassociated with proof copy).

Preferably, an envelope is also generated.
1) The envelope graphics are retrieved from the database.
2) The recipient's address is positioned and applied for the envelope.
3) E-postage is applied if postal delivery.
4) If express/registered/certified delivery is indicated, the necessary FedEx or UPS or US Postal forms are composed and sent with the print job.

Preferably, in the case of a fax delivery process, the following is a preferred process.
1) Fax cover sheet is composed according to sender database entries and an HTML document template supplied by the system and precedes the letter.
2) The cover sheet is populated with appropriate information for sender and recipient from database entries of the sender and recipient or from "approved" proof copy form.
3) The correspondence item is composed as above, however, using 200 dpi gray scale images for letterhead/stationary/cards/envelopes instead of high-resolution color images. These images are either a) stored in the database of the sender b) generated programatically when needed from the high-resolution color images in the database.

4) No envelope is produced.

5) Alternatively, the sender may choose a single page fax letter format, instead of a separate cover sheet, which causes a somewhat different HTML template from the system (but quite similar composition process) to be executed.

Preferably, when an HTML email is a delivery method, the following is a preferred process.

1) The type of the letter (e.g., Business/Personal/Legal) is determined from the sender's addressee database entry (ies) for the recipient(s) or from an "approved" proof copy form.

2) The delivery method(s) of the letter (e.g., Email/Fax/Postal/Express) is determined from the sender's addressee database entry(ies) for each recipient(s) or from an "approved" proof copy form(s); HTML email composition applies when Email is selected as the only or one of several delivery methods.

3) The format and size and layout of correspondence item is determined from the database (e.g., 8½×11, A4, 8½×14, Monarch, postcard, announcement) or from an "approved" proof copy form.

4) The appropriate business letter/personal letter/card/announcement or HTML template is selected; templates are a part of the system and provide an "HTML" shell that can be modified to insert various sender specific graphics and contents into the correspondence item. This is much simpler than generating the entire HTML programatically.

5) The appropriate screen resolution (72 dpi) graphics for the stationery, card or letterhead are retrieved from the database or from an "approved" proof copy form. References are inserted into the HTML template.

6) The fonts are determined from the sender's database or from an "approved" proof copy form, and references inserted into the HTML template.

7) The date of the letter is composed and inserted into the HTML template.

8) The inside address of the letter is composed with address book entry for the recipient (preferences) or taken from an "approved" proof copy form and inserted into the template.

9) The greeting is composed according to the retrieved database settings (preferences) and inserted into the HTML template.

10) The body of the correspondence is formatted and composed and inserted into the HTML template.

11) The closing is composed according to the retrieved database settings (preferences) and inserted into the HTML template.

12) The appropriate screen resolution (72 dpi) signature graphic is retrieved from the database according to the retrieved database settings, and reference is inserted in to the HTML template.

13) The printed name retrieved from the database is inserted in the HTML template.

14) A secretarial line is composed from sender's initials and inserted in the HTML template for business letters.

15) Enclosures line is added where appropriate (attachments specified with initiating request).

16) A finished HTML file and associated graphics files are posted to a web site for delivery as a text URL reference that can be displayed by browser, and/or are posted to a multi-part HTML email that can be displayed by HTML email programs.

Letterhead graphics require a fixed region to display and can collapse only to a limited extent. Therefore, it is preferred that a minimum display width be set. Any window less than the minimum display width would have to scroll to see the letter. Similarly, letterhead graphics can only be expanded to the width of a real page (or perhaps somewhat larger) and retain the look desired by the designers, so a maximum should be set. Within the limitations of HTML, HTML deliveries are coded to display between such minimum and maximum widths, dependent on the display window. A simpler variant is used with fixed width HTML objects, and may in some cases actually yield more desirable results than the variable width items.

HTML Proof Copies of Correspondence Items

A sender has the opportunity to review a proof copy of the correspondence preferably comprising an HTML version of the correspondence item prior to its delivery and various preferences subject to change, and the text of the correspondence subject to change. This HTML version of the correspondence is delivered as an email (FIGS. 4 and 5) or displayed at the web site when that interface is used. The HTML version accurately represents the graphical composition and layout of the correspondence item and allows the sender to approve (or change) the correspondence to be sent. The sender can make changes to the type of correspondence, choice of stationery and the delivery method(s) for the correspondence, text, greeting, closing, signature, and more (FIG. 5). The HTML proof copy of the correspondence allows (1) the sender to approve correspondence content (text) and appearance; and (2) to dispatch the correspondence according to either the preset preferences for the recipient(s) or modified preferences that the sender indicates in the returned proof copy form.

Many email programs (such as AOL) do not provide support for the recent HTML email standards. Therefore, direct HTML viewing in the email program requires a dual mode email message that is supported by more recent HTML email programs. In such an arrangement, 1) The first part of this message is a standard email, and is read by all email programs. This part of the message is a URL link to a World Wide Web URL where the correspondence proof copy is posted. In most email programs, the Web browser can be activated and the URL selected for viewing, just by selecting the link by mouse click.

Figure 4:
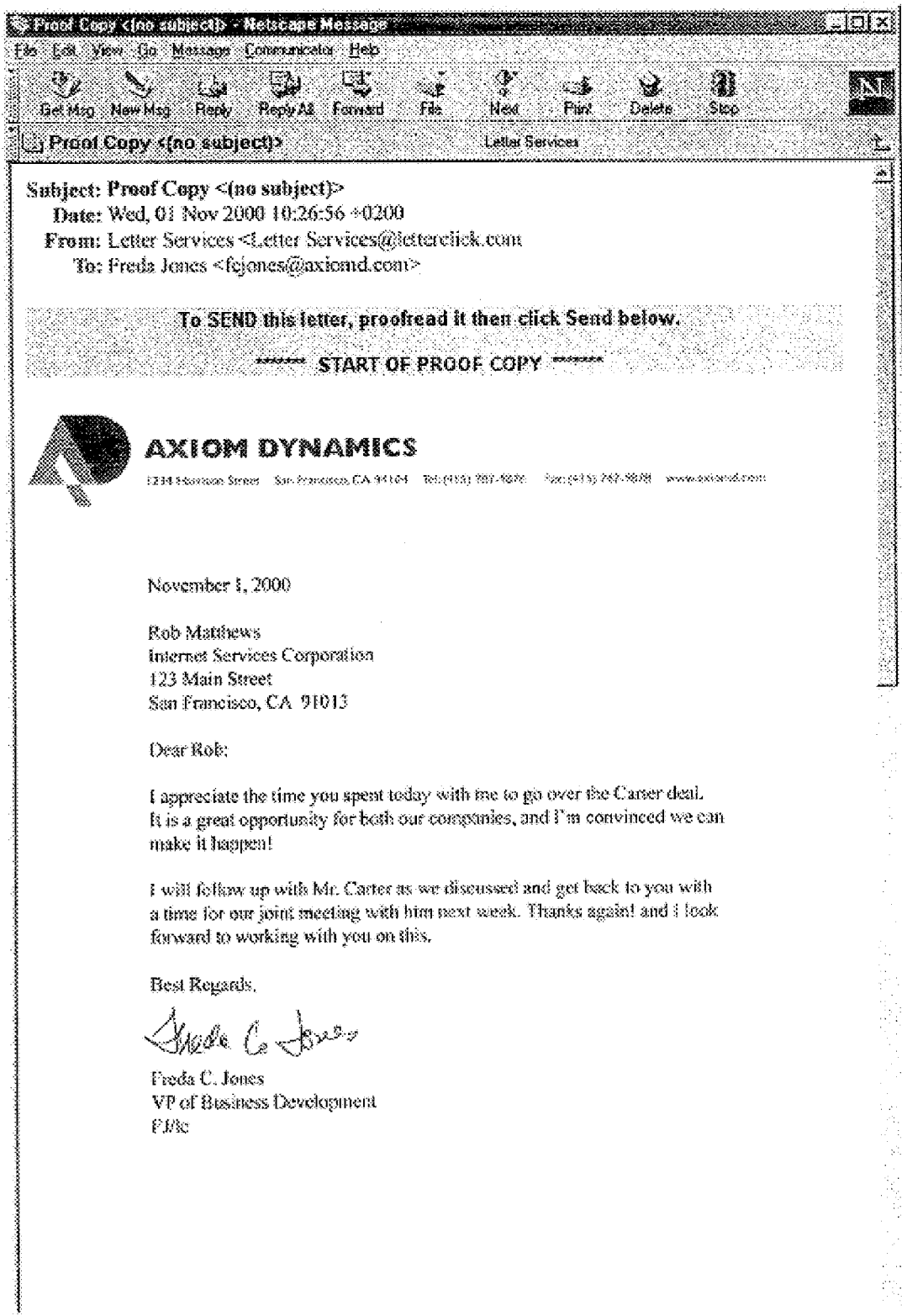
FIG. 4 shows an example of a screen image showing a partial proof copy of a letter for review by the sender and it includes a digital image of the sender" signature and sender" letterhead.
Figure 5:
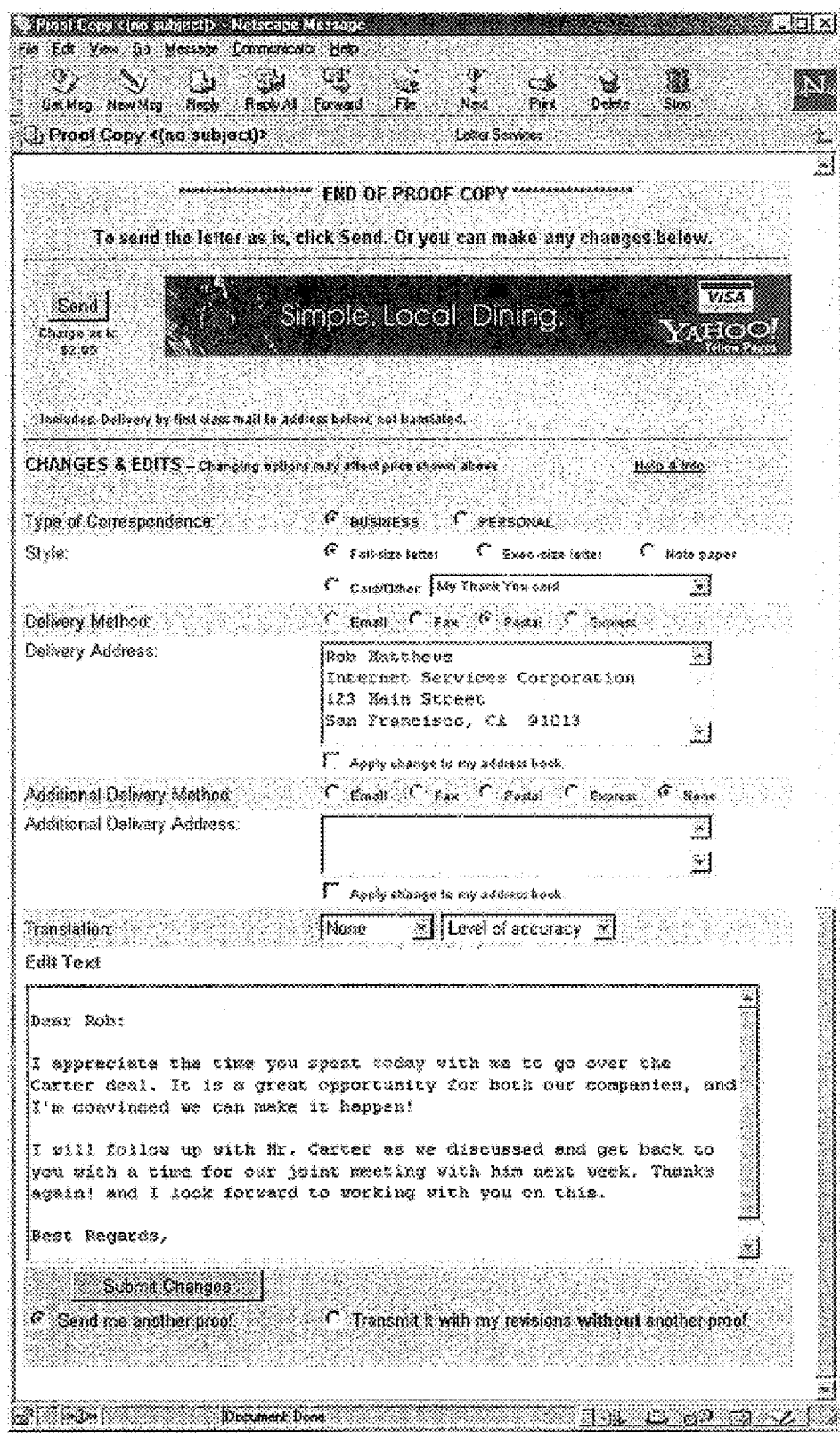
FIG. 5 shows a partial proof copy of a letter for review by the sender and includes a set of preferences that can be modified by the sender, as well as the ability to modify the correspondence content.

2) The second part(s) of the message is the HTML that provides a complete representation of the correspondence item, along with HTML forms and selection items that allow changes to the correspondence and delivery methods (FIG. 4).

The proof copy for hard copy items has the following design requirements.

1) The proof copy image represents, as nearly as possible, the exact image that is printed for hardcopy. This implies that exact content of each line of text, location and appearance of graphics, including fonts and pagination will mimic the hardcopy to be printed.

2) The HTML of the proof copy sets a fixed width image for representing the item image, and that such images will be scaled according to the physical size of the item to be printed. A width of an American letter (8½ inches×11 inches), for example, could for example be displayed as 612 pixels by 792 pixels, @ 72 dpi of screen resolution this would approximate the actual size of the paper. When a graphic is saved at 100% size at 72 dpi, it's on-screen display size is set.

3) Font size is the other element for making an HTML letter accurately represent a printed one. The standard Times New Roman size—at least on Windows machines—seems to approximate 12 point type closely. Unfortunately, 12 point Times New Roman displays smaller on Internet Explorer than on Netscape Navigator, and much smaller in a Mac browser. The other problem is that Arial, the other standard HTML font, displays substantially larger than Times. Therefore, font sizes are modified in the HTML letter to overcome these variations as much as possible.

4) A 1 to 1 screen size is typically not optimum for representing the content of the correspondence, and provides for scaling the displayed correspondence image. One natural representation puts all of the page on an 800×600 screen, and applies a scale of 75% to the above pixel count. All other printed items are sized independently, not necessarily in relationship to the letter size. An initial sizing at full scale relative to 72 dpi is used, with a parameter that is changed for each correspondence item (full size letter, monarch/executive letter, note, announcement, postcard, etc.) that allows scaling for optimum representation.

5) The edit box of the proof copy for the body of the correspondence shows the line breaks exactly as they appear in the correspondence to be printed. This allows the sender to manipulate (add/subtract/change location of) line breaks and page breaks. Page breaks are represented in the edit box by <PAGE BREAK> preceding the first line of text that goes on the new page. This implies that proof copy composition does a "layout" of the hardcopy page and determines where line breaks and page breaks occur, inserting hard carriage returns and <PAGE BREAK> into the HTML edit box as appropriate. It also requires the edit box be specified at a width that circumvents the forced line wraps that HTML imposes. It further requires that the composition module ignores hard carriage returns in the edit box text that is returned (and in the initial requesting email) except where they precede a blank line. Whereas the latter case implies the start of a new paragraph, the general case implies nothing when composing the lines for page layout of a correspondence item.

6) The margins for each type of correspondence item (top, left, right, bottom) are independent, one for each type of item, and are system parameters that can be changed.

7) Monarch/Executive size items utilize the same graphics as full size (American or European) scaled down by an easily computed ratio determined by the difference in sizes of the two items.

8) Large Envelopes (the kind that hold an entire page unfolded) utilize the same graphics (expanded by 20%, a changeable system parameter) as the standard envelopes that hold a tri-folded page.

9) Envelopes for cards and announcements are scaled according to a system parameter (initially set to 100%).

10) Fax cover sheets, and one page Fax letters are composed according to HTML document templates that are supplied by the system and can be modified; using gray-scale versions of fullsize letterhead graphics.

11) Attachments to an initiating email are saved and transmitted with the final letter.

Security for Sender

The present inventive process and apparatus optionally provides a security mechanism for a sender to insure that forged correspondences are not sent out erroneously. Security issues are important with regards to generation of correspondence using online systems connected to the Internet and utilizing email. A first security issue is an identity assumption and generation of a letter falsely attributed to a particular sender or registered sender. This problem exists because of the nature of email. Email is issued from an SMTP server through an anonymous connection. The issuer of an Email can set the identity of his Email program to mimic that of another Email user, and hence, could in practice assume the identity of a registered sender and request generation of a correspondence to a recipient in the registered sender's address book. The process provides for several levels of security, optionally selected by the sender, that provide security that makes such identity assumption difficult if not impossible.

A basic level of sender identity security is when the inventive process generates a proof copy of the correspondence emailed back to the sender. The sender must retrieve this email from his or her POP server with his or her email program. In so doing, the sender must have password-controlled access to the POP server. This is the security mechanism that prevents others from retrieving the sender's email. This is a first level of identity security because the sender is required to authenticate his or her identity by retrieving and approving the proof copy. The only ways to defeat this security is to breach the POP server security of email, steal or otherwise obtain the password of the registered sender's POP server, or to physically have access to the registered sender's computer system and email program with embedded password information.

A second extended level of sender identity security utilizes a Public Key--Private Key encryption system and digital signatures. Both forms of security are available for software providers. For example, a registered sender obtains a Private-Key Public-Key pair from a number of providers on the Internet (e.g., Thawte, RSA, Verisign) who verify to some level of certainty regarding the identity of the sender. The sender configures his or her email program (Netscape, Outlook Express, Eudora) to be a) digitally signed with his or her key information, and/or b) encrypted using a double key mechanism of encryption. The sender provides the Public Key information and the digital signature information to the service provider of the inventive service during the registration process and these data are stored in the database. The registered sender sets preferences in the invention to reject any "unsigned" requests and/or to receive requests in encrypted format", then initiates correspondence requests based with digital signature and/or encryption. The database verifies the digital signature, and/or decrypts the request message before proceeding with fulfillment of the request, and hence provides a very strong security that the sender of the request is indeed the registered sender, and not an imposter. The only method to defeat this security is to physically possess the registered sender's email program with security keys embedded, or to have obtained the sender's public key, and surreptitiously obtained the private key, setting up duplicate digital signature and assumed identity in a different email program installation.

There is further provided an optional level of security for credit card/EFT information, signatures and generated correspondence. Credit card information, Electronic Funds Transfer information, high-resolution digital replicates of personal signature(s) and copies of letters generated and sent are stored. The prevalence of Internet security breaches by hackers is a cause of concern for misappropriation of such information. The inventive process is preferably configured with firewall and standard security mechanisms. In addition, the inventive apparatus architecture is designed such that no security sensitive information is stored on drives that are directly connected to the Internet and have incoming ports open. The Database server (12) is where the sensitive information is stored. Access to the Database server (12) from the vulnerable Internet connected systems is preferably by SQL query protocol. Hence, to access sensitive data the hacker would have to penetrate the vulnerable system and interact with the Database server (12) via an SQL interface. Though this is possible, the inventive process preferably stores sensitive information in the database in encrypted format (e.g., credit card info, EFT account information, high-resolution signature graphics, and letter archives). Even if a hacker were to succeed in retrieving such data from the database, the hacker would then face a virtual decryption nightmare to make these data useful (FIG. 1). Servers that do have the encryption/decryption keys and algorithms are the Composition server(s) and the Operation server(s) (13). Composition servers 13 have no connection to the Internet. The connection to the Web server is limited to one strictly limited and monitored interprocess protocol. The connection to the outgoing Email server (11) is not at risk, because the outgoing Email server 11 cannot be penetrated from the Internet. The Operation server 13 is preferably connected to the Database server 12 by a monitored SQL protocol port only, and by VPN to the Print/FAX servers 14, providing a unlikely penetration risk. This architecture and these connectivity methods (FIG. 1) provide a high level of security around sensitive information that is held in the database and required for correspondence generation.

Certain of this information need to be accessed by the Web Server 10 and displayed to the registered sender. For credit card information, for example, the Last 4–5 digits are stored unencrypted and can be displayed to the registered user to identify which account is on file. Similarly, EFT accounts are only trailing account digits. Signatures in 72 dpi, low resolution for computer screen display are stored unencrypted, but these are of insufficient quality to be printed and applied to correspondence or legal documents to affect a convincing forgery, so are not viewed as a security risk.

Apparatus

The invention provides software that operates on a system comprising one or a plurality of computers connected by LAN and/or the Internet, by which an email from a "sender" is utilized to compose and generate a digital graphic representation of any written communication to one or multiple recipients. The graphical digital representation of the written communication is presented to the "sender" for correction/revision and for a delivery method decision. The delivery method decision will affect where required a printing (onto a fixed medium of expression) of a physical representation of the communication and any related delivery envelopes/paperwork at a location with local access to the delivery organization (i.e., postal mail or express courier service). Alternatively, the delivery means can be by an electronic means (i.e., Fax or email).

The computer system preferably comprises (a) a first host computer comprising one or a plurality of databases listing registered sender information (preferences), including, but not limited to senders preferences and data for generating various forms of correspondence (such as, digital representations of a senders signature, business letterhead, preferred letter styles, etc.), (b) optionally a second host computer comprising one or a plurality of databases that implement a separate "address book" database for each "sender" and which contains "sender" supplied data regarding preferences and data for generating correspondence to the "addressee" (such as, email addressees), fax number(s), phone number (s), etc.); (c) a commercial email server to collect and dispatch email messages and operably connected to the first and second host computers; and optionally (d) a commercial web site server software. Preferably, the inventive apparatus further comprises Fax transmission software, such as Win-Fax from Symantec. Preferably, the inventive apparatus further comprises printer output devices, such as high quality color printers.

With regard to FIG. 1, this diagram shows a block diagram of a preferred configuration of hardware systems to implement the inventive process. An Internet server 10 comprises one or more computers, connected to the Internet 16, with appropriate firewall(s) 15. The Internet server 10 runs the registration and preference setting software and stores the first database. Examples of appropriate Internet servers 10 are a Sun SparcServer with associated Unix operating software and Cold Fusion Web server software connected to the Internet through a commercially available firewall 11, such as a Compaq Prosignia running Microsoft Windows NT and Microsoft Proxy Server, or such as a Cisco 2501 Router. The inventive apparatus further comprises a Database server 12, wherein the database server 12 comprises one or a plurality of computers connected to the Internet server 10 and to an Email server 11 by a network. The network can be a private Local Area Network, Wide Area Network or Virtual Private Network providing large scale high volume data transmission services. A suitable Database server 12 or Email server 11 is, for example, a Sun SparcServer or Digital Alpha Server with associated Unix operating software and Oracle SQL database software. The Email server 11 further runs correspondence composition software as described in the inventive process. The Email server comprises one or a plurality of computers that run the registration and preference setting software as described in the inventive process. Preferably, the Email server 11 is connected to the Internet with appropriate firewall(s) 15, and to the Database server 12 and to an Operations server 13 by a network. Examples of suitable networks include, but are not limited to private Local Area Network, Wide Area Network or Virtual Private Network. Examples of suitable Email servers 11 include, but are not limited to, a Sun SparcServer, with associated Unix operating software and Cold Fusion Web server software connected to the Internet through a commercially available firewall system(s). An Operations server 13 comprises one or a plurality of computers connected to the Database server 12, the Internet server 10, the Email server 11, the Internet 16 and a printer or other hardcopy output source 14 via one or several networks. Examples of networks include Local Area Networks, Wide Area Networks or Virtual Private Networks. The Operations server 13 runs a registration and preference setting software program for the registration process as described here. Examples of suitable Operations servers include, but are not limited to, a Sun SparcServer with associated Unix operating software and Cold Fusion Web server software connected to the Internet in a VPN configuration through a commercially available VPN/firewall system(s) such as a Sun SparcServer running Unix operating software and Apache VPN/Proxy server software.

There are also one or a plurality of Print/FAX servers 14. The Print/Fax servers comprise one or a plurality of computers, connected to the Operations server 13 by a network, wherein the network is a private Local Area Network, Wide Area Network or Virtual Private Network. A suitable existing computer for each such Print/Fax server 14 is a Compaq Prosignia 720, with Microsoft Windows NT operating software and Symantec WinFAX server software, and a Xerox 55×× color laser printer.

The Internet server(s) 10, Database server(s) 12, Email server(s) 11, Operations server(s) 13, and the Print/FAX servers 14 may be located at any location served by the network. The location of the hard copy correspondence is best sited to facilitate rapid delivery to the recipient. Instead of trying to locate a printing facility to create hard copy in each zip code, the inventive process will locate printing facilities in overnight courier hubs and/or in regional postal distribution hubs. In a minimal configuration, one major delivery hub, such as Oakland Calif. in the United States can serve the entire world provided FedEx, UPS, and a US Postal Service sorting and routing facilities are commonly located there. In the preferred implementation, a printing facility is located at the main hub of every major delivery service. For example, FedEx uses Memphis airport as a hub such that planes with deliveries leave each major city in the evening and land in Memphis in the middle of the night for sorting to the planes to deliver the items to their return cities. A printing facility that is located in or adjacent to the hub sorting facility, obviates the need for a large number of hard copy printing stations throughout the country or world and substantially reduces the time and costs to deliver the mail object. Other suitable overnight couriers include UPS and Airborne. As further example of maximum benefit of the inventions hard copy delivery features, London ENGLAND or Frankfurt GERMANY would serve as an excellent regional hub for postal or express deliveries throughout Europe. Similarly, Hong Kong CHINA would serve the entire Asian continent well.

Registration Process

Figure 2:
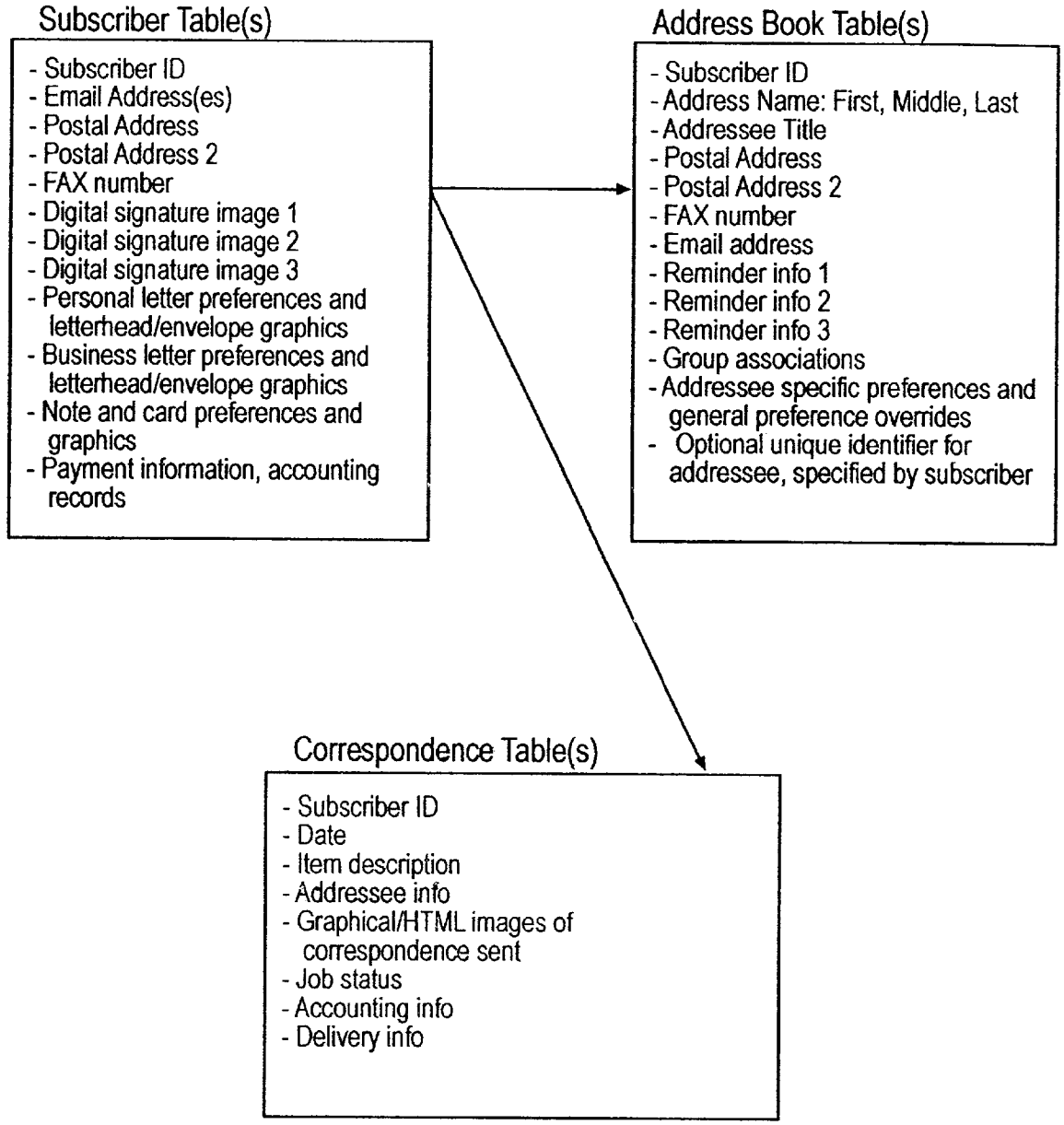
FIG. 2 shows an illustrative structure of the fields of a first database for a hypothetical subscriber or sender.

The inventive process is designed for composition, generation and delivery of written correspondence. Prior to implementing a written correspondence, a sender must first register. The registration process involves obtaining information from the sender for the database(s). A registered sender implements the process of sending a written correspondence to one or a plurality of recipients by indicating the names of the recipients, or if not in the sender's profile, then providing address information for each recipient and the nature of the conveyance (e.g., fax, postal mail or express courier). The location of each recipient is determined in either the first database having the locations of recipients associated with each sender or is requested directly from the sender (and then added to the first database). The sender creates a correspondence using a template previously provided in the first database. The text of the correspondence can be provided with a simple email message. Once the correspondence has been created with the text of the email message along with template from the database (such as a letterhead), a graphical representation of the correspondence is sent to the sender for review, changes (if any) and approval. Once the final correspondence is approved by the sender, the document is transmitted to a hard copy location according to the instructions of the sender, or to be faxed or to be delivered as an HTML format. For hard copy, the transmission can be sent, for example, to a printer located adjacent to an express courier hub or via facsimile transmission for hard copy creation With regard to FIG. 2, a hypothetical subscriber ID is illustrated showing examples of various fields in the first database. These include the upper left box that contains information concerning the sender such as the sender's email and postal addresses, various digital signature images, letter preferences and letterhead graphics. The upper right hand box illustrates fields of a listed recipient in the sender's address book. The bottom box provides fields for structuring a reference file for each sender to be able to access electronically images of correspondences sent and sorted by subscriber, date, keywords in description, addresses and recipients.

Figure 3A:
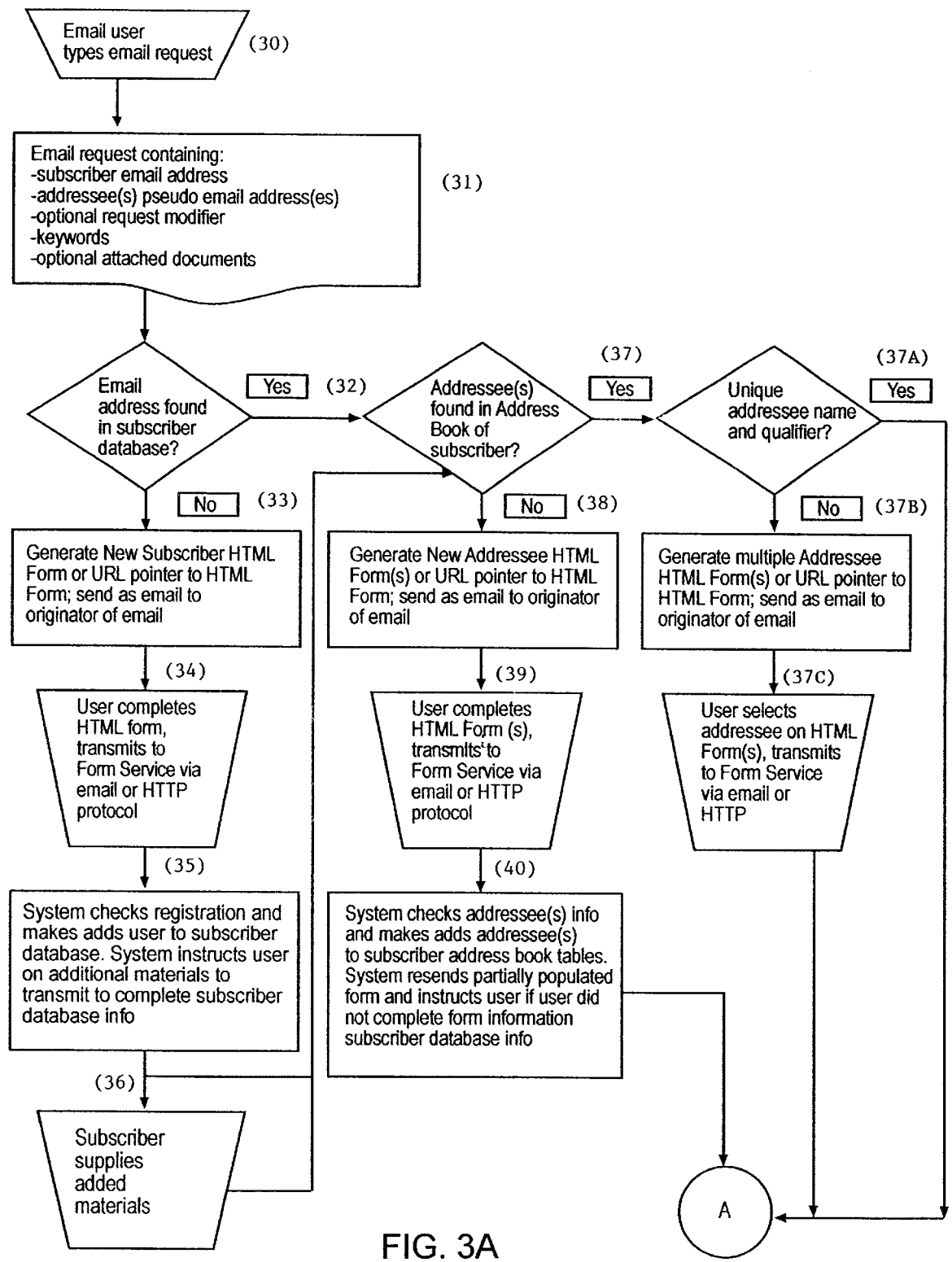
FIG. 3 shows a flow chart of the process of a sender "email user" registering (FIG. 3A), identifying recipients and their addresses (FIG. 3B) and ultimately transmitting the correspondence by any or all of three means of transmission (FIG. 3C).
Figure 3B:
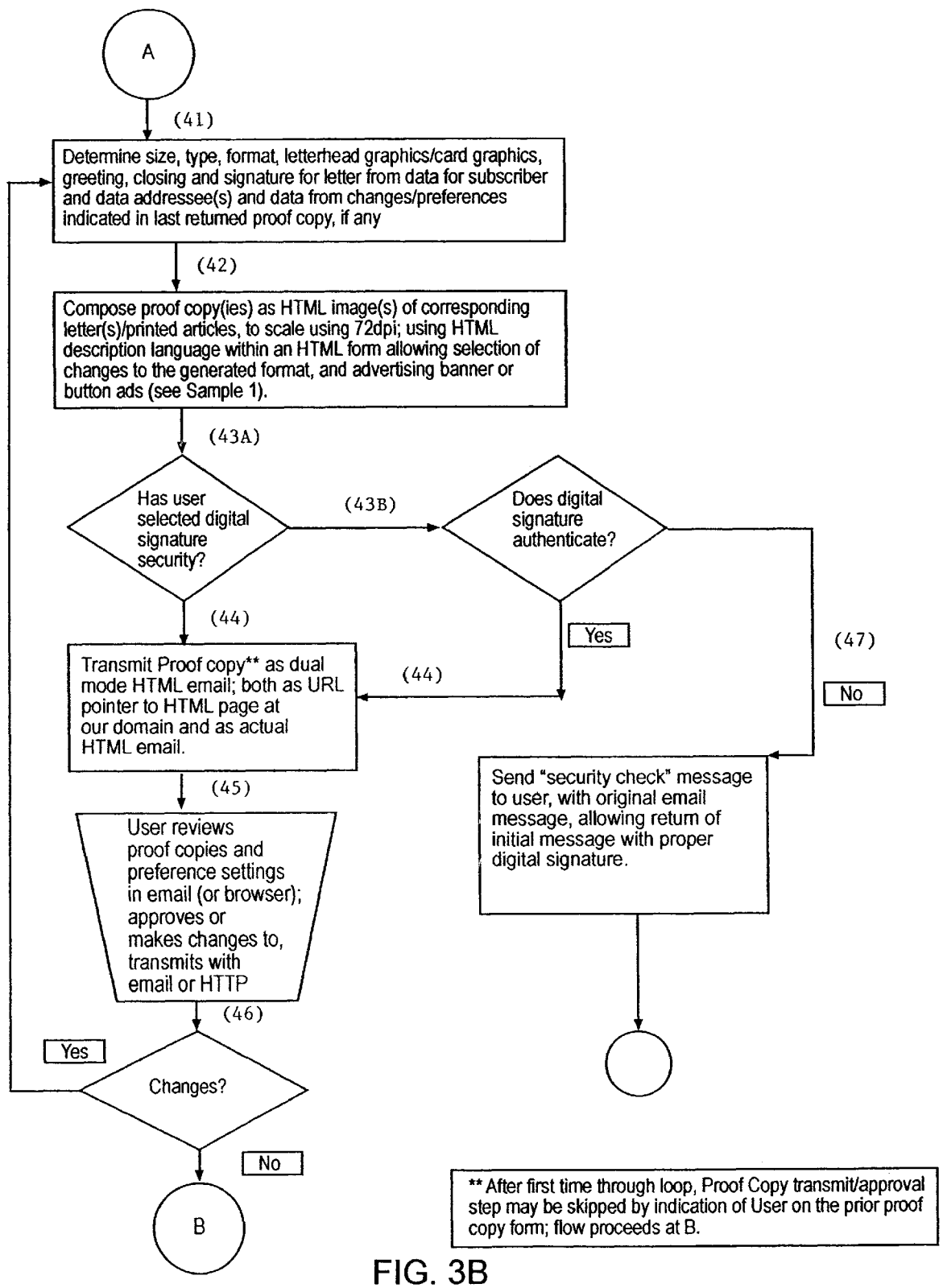

With regard to FIG. 3 and specifically FIG. 3A, provides a process for signing up new subscribers or senders. Specifically, a sender (email user) initiates a request 30 and this request is coded with sender information from the first database 31. The Email server 11 and Database server 12 first determine if the sender is a registered sender 32 and if not go through the registration process of generating a new subscriber HTML form 33, transmitting a completed subscriber form 34 to the Database server 12, checking the new subscriber information 35 and completing the new subscriber registration process 36. Each recipient (called "addressee" in FIG. 3A) needs to have an address located either in an address book of each registered sender (go to FIG. 3B) or the address has to be entered by going through a process of generating a new address HTML for each recipient 38, having the user (sender) complete the HTML form 39 and transmitting such information to the Database server 12, and checking the recipient address information and adding such information to the sender's address book 40.

Once the recipients are identified and their addresses obtained or accessed (A) (top of FIG. 3B) the formatting of the correspondence is determined 41 through either an existing template in the registered sender's database or a new template. The sender transmits through email the text of the correspondence that this text is incorporated into the correspondence format to generate an HTML graphical image of the draft correspondence 42. The next step is to determine if a digital signature of the sender is needed 43A and to authenticate that signature with the sender 43B. If a security check is needed 47, an additional step is required to provide additional security to the sender. A draft correspondence image in HTML format (or dual mode URL pointer) is transmitted to the sender 44, who reviews and approves 45 or makes changes and approves 46 to finally get to the transmission to the recipient process B.

Figure 3C:
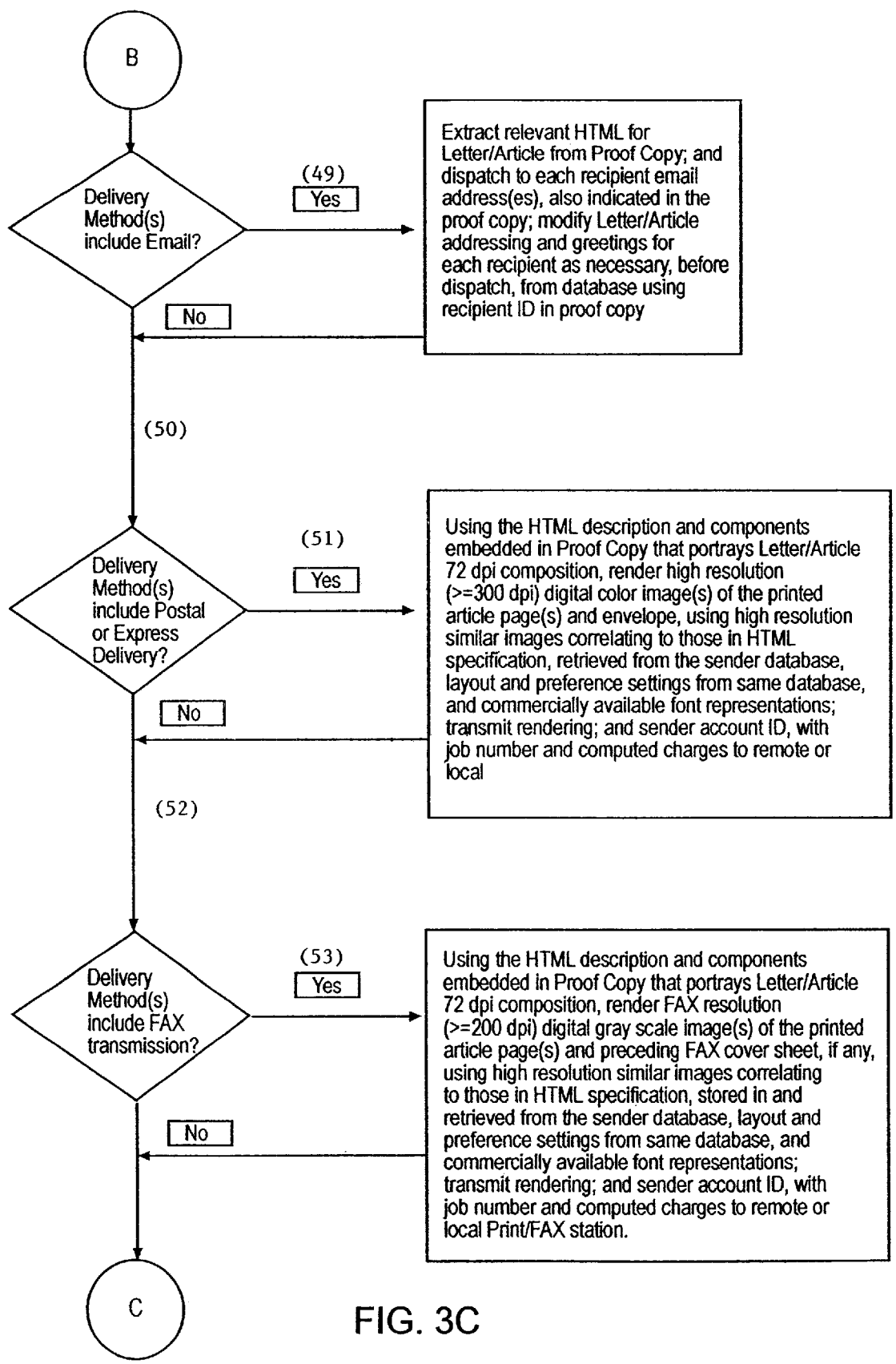

In FIG. 3C, the correspondence is created and approved by the sender (B). The sender has a choice (not exclusive) of delivery methods. The sender can choose email and the relevant HTML information will be extracted and sent to the recipient 49. The sender can choose hard copy delivery, such as by postal or private courier means 50, and the HTML description and components embedded in the relevant HTML file will be electronically dispatched to a properly located Print/Fax server 14 to print a hard copy for dispatching through the local courier or postal service 51. As a third alternative, the sender can choose transmission by fax 52 and the HTML file and components embedded in it will be transmitted to the Print/Fax server 14 for telephone line facsimile transmission to the facsimile number of the recipient 53.

Figure 6:
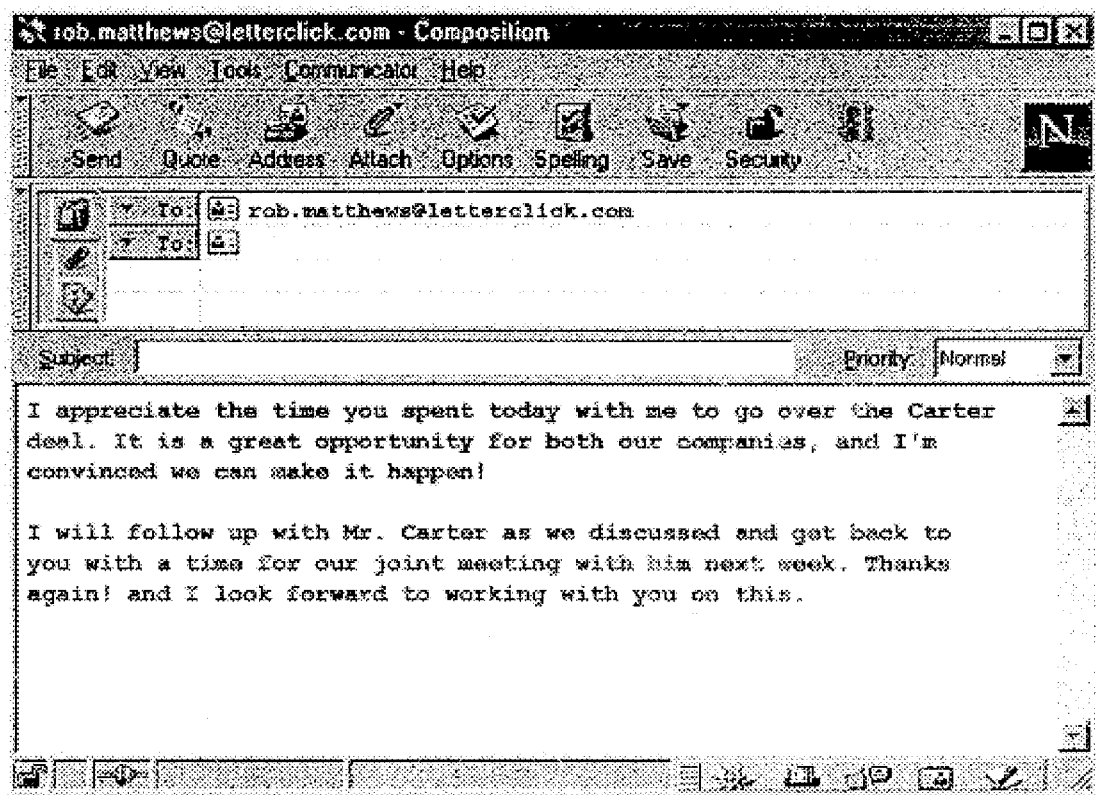
FIG. 6 shows sample screen page for a sender email used to compose his or her correspondence according to the inventive process that resulted in the correspondence proof copy shown in FIGS. 4 and 5.
Figure 7:
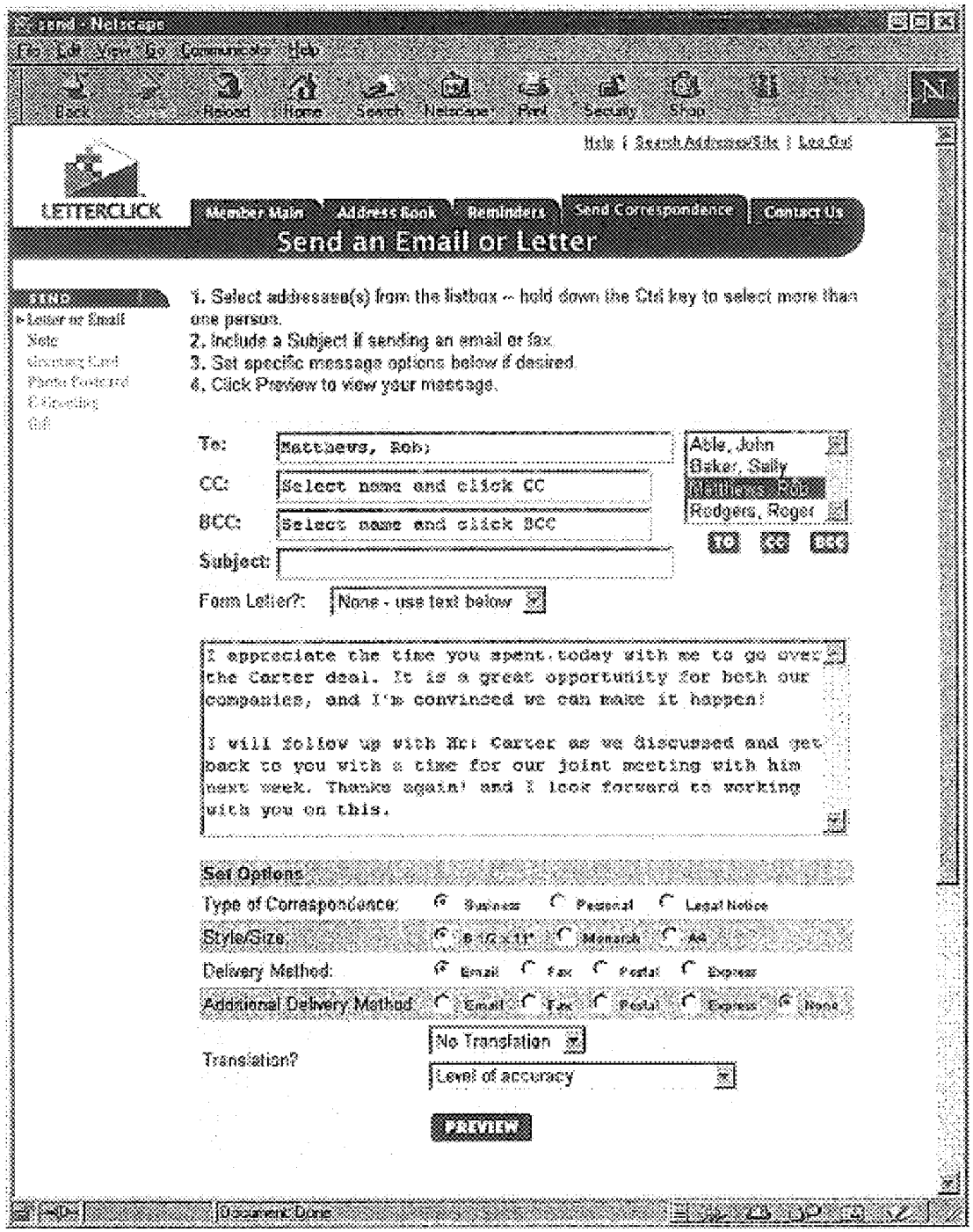
FIG. 7 shows a sample World Wide Web page for a sender that used alternatively to compose his or her correspondence according to the inventive process that results in a correspondence proof copy similar to shown in FIGS. 4 and 5, but displayed with a Web browser.

FIGS. 4 and 5 show an example of a screen image showing a proof copy of a letter for review by the sender and it includes a digital image of the sender's signature and sender's letterhead. FIG. 8 shows a sample of the HTML email delivered correspondence that results from approval of the proof copy of FIGS. 4 and 5. FIG. 6 shows a sample screen page for a sender to compose his or her correspondence in email according to the inventive process that resulted in the correspondence shown in FIG. 6. FIG. 7 shows a sample screen page for a sender to compose his or her correspondence at a web site according to the inventive process that resulted in the correspondence shown in FIG. 6.

I claim:

1. A method for generating completed mail objects from e-mail or text message from a registered sender to be received by recipients, the mail objects having graphical correspondence content and graphical representation of a signature, comprising the steps of:

(a) receiving a correspondence message from the registered sender containing text, names of recipients, and identity of the registered sender;

(b) locating pre-registered sender information in a database, wherein the database comprises preferences having correspondence format information and a graphical representation of a registered sender's letter head and a registered sender signature;

(c) obtaining recipient location information from either the database containing names and addresses of recipients for each registered sender or directly from the registered sender; and (d) generating a completed correspondence to deliver to a recipient by one or more transmission means selected from the group consisting of transmitting a facsimile to a facsimile telephone number utilized by the recipient, transmitting an e-mail providing or linking to a graphical representation of the completed correspondence to an Internet address utilized by the recipient, generating a hard copy of the completed correspondence for submission by hard copy delivery services, and combinations thereof, wherein the completed correspondence comprises a correspondence message along with integrated graphic preferences, the graphic preferences including the registered sender's letter head and the registered sender signature.

2. The method of claim 1 wherein the text message is supplied to a website interface instead of an email.

3. The method of claim 1 wherein the hard copy completed correspondence is generated at a location facilitating rapid delivery to the recipient using existing delivery services.

4. The method of claim 3 wherein the completed correspondence is created at a location adjacent to an overnight courier hub.

5. The method of claim 1 wherein the hard copy completed correspondence is sent by facsimile transmission to the recipient's fax machine.

6. The method of claim 1 wherein the database includes names, postal addresses, email addresses, and telephone numbers for recipients.

7. The method of claim 1 wherein the database includes the potential for each registered sender to have multiple formats for documents, to have multiple signatures for different individuals registered with a particular registered sender, and identification information to include with each correspondence.

8. The method of claim 1 prior to step (d), further comprising generating a proof copy of the correspondence to be sent by email to the sender for review and approval.

9. The method of claim 8 wherein the sender approves the proof copy of the correspondence by return email or by HTTP transmission.

10. The method of claim 8 wherein the sender is able to change the correspondence or the preferences associated with the correspondence.

11. The method of claim 10 wherein the preferences that can be changed are selected from the group consisting of letterhead style, recipient delivery means, greeting, closing, signature, text of correspondence, and combinations thereof.

12. The method of claim 1 wherein the correspondence message further comprises additional information selected from the group consisting of attachments, preferences, and combinations thereof.

13. The method of claim 12 wherein the preferences are specified on a subject line of an email message.

14. A system or an apparatus for generating completed mail objects from e-mail messages from registered senders to be received by recipients in remote locations in hard copy, Fax transmission, or HTML e-mail, the mail objects having message information, graphical letterhead, and graphical representation of a signature, comprising:

(a) a computer or server means for receiving a correspondence message from the registered sender containing text and other information to be included in a correspondence;

(b) a database having pre-registered sender information and preferences, wherein the database comprises a sender's preferences for correspondence format information, recipient information and address, and a graphical representation of a registered sender's letter head and a registered sender signature;

(c) recipient location information, wherein a source of the recipient location information is from either the database containing names and addresses of recipients for each registered sender or directly from the registered sender; and (d) a remote or local facility for generating a completed correspondence in a hard copy at a location facilitating rapid delivery to a recipient using existing delivery services, or a Fax server for generating the completed correspondence in a Fax correspondence telephoned to the recipient's fax, or an E-mail server for sending the completed correspondence in an HTML format to the recipient, wherein the completed correspondence comprises a correspondence message along with integrated graphic preferences, the graphic preferences including the registered sender's letter head and the registered sender signature.

15. The system for generating completed mail objects from e-mail messages of claim 14 wherein the hard copy completed correspondence is created at a location adjacent to an overnight courier hub.

16. The system for generating completed mail objects from e-mail messages of claim 14 wherein the completed hard copy completed correspondence is sent by facsimile transmission to the recipient's fax machine.

17. The system for generating completed mail objects from e-mail messages of claim 14 wherein the database includes names, postal addresses, email addresses, and telephone numbers for recipients.

18. The system for generating completed mail objects from e-mail messages of claim 14 wherein the database includes the potential for each registered sender to have multiple formats for documents, to have multiple signatures for different individuals registered with a particular registered sender, and identification information to include with each correspondence.

* * * * *